United States Patent [19]

Scobie

[11] Patent Number: 4,496,135
[45] Date of Patent: Jan. 29, 1985

[54] ALIGNMENT MAINTAINING APPARATUS FOR TRUNNION MOUNTED VALVES

[75] Inventor: William B. Scobie, Houston, Tex.

[73] Assignee: Keystone International, Inc., Houston, Tex.

[21] Appl. No.: 614,300

[22] Filed: May 25, 1984

Related U.S. Application Data

[63] Continuation of Ser. No. 344,503, Feb. 1, 1982.

[51] Int. Cl.$^3$ .............................................. F16K 1/22
[52] U.S. Cl. .................................. 251/308; 403/248; 403/277
[58] Field of Search ............... 251/305, 306, 307, 308; 403/248, 250, 277

[56] References Cited

U.S. PATENT DOCUMENTS 3,776,651 12/1973 Peter et al. .......................... 403/248
4,146,206 3/1979 Malloy et al. ....................... 251/308

FOREIGN PATENT DOCUMENTS 1015779 10/1952 France ................................ 403/250

Primary Examiner—Martin P. Schwadron
Assistant Examiner—James R. Shay
Attorney, Agent, or Firm—Browning, Bushman, Zamecki & Anderson

[57] ABSTRACT

An apparatus for maintaining valve element/valve seat alignment in valve assemblies employing trunnion mounted valve elements, the apparatus including a shaft or trunnion attached to the valve element and provided with an axially extending bore which receives an expandable plug, axially fixed relative to the shaft, there being means provided to laterally expand the plug to effect frictional engagement between the plug and the bore of the shaft.

13 Claims, 7 Drawing Figures

ALIGNMENT MAINTAINING APPARATUS FOR TRUNNION MOUNTED VALVES

This is a continuation, of application Ser. No. 344,503, filed Feb. 1, 1982.

BACKGROUND OF THE INVENTION

1. Field of the Invention

The present invention pertains to an apparatus and method for the maintenance of valve closure element/valve seat positioning within valves having trunnion mounted valve elements. More particularly, this invention relates to an apparatus and method to aid in the maintenance of disc/seat concentricity within a butterfly valve.

2. Description of the Prior Art

In valves in which the valve closure element is mounted by means of a trunnion or shaft within the valve body, misalignment of the valve closure element with the valve seat can result in accelerated seat wear, excessive leakage, and in aggravated situations, total valve failure. This is particularly true of butterfly valves, especially butterfly valves of double offset disc construction, with wetted shafts where line pressure on the lower enclosed end of the shaft can move the disc out of concentricity with the seat.

Disc/seat misalignment may also occur as a result of fitting an actuator to the valve. Since it is desirable that the shaft of the valve fit tightly in the actuator bore, it is necessary to exert some degree of force to push the actuator onto the valve shaft. If the disc is not restrained against downward movement as the actuator is fitted to the top of the valve, it will be displaced and moved out of concentricity with the seat.

Current solutions to the problem of preventing valve element/valve seat misalignment generally involve machining operations that bring the valve element, e.g. disc, and seat within close tolerances prior to assembly, or additional machining after assembly. One solution in the cse of butterfly valves has been to utilize spacers fitted between the disc hubs and the body bore. This solution demands the application of additional body machining to close tolerances or the use of sized spacers for individual valves. Either of these two methods is expensive. Furthermore, the end result is not particularly effective. Fitting spacers between the disc hubs and the body bore subjects the disc to jamming due to line media contaminants clogging, or corroding, the rubbing surface between the disc hubs and the spacers. This method also is very time consuming and does not lend itself to efficient manufacturing operations.

A second alternative solution utilizes a shaft incorporating an integral, nonadjustable end button. In this method, the valve is assembled and the disc centered prior to being pinned to the shaft. The valve then requires a further machining operation in order to fit the disc/shaft pins. This method involves handling and machining after the initial assembly which adds to costs and leads to inefficient manufacturing operations. Furthermore, this method exposes the assembled valve to undesirable metal cuttings from the machining operations.

If the same above method is used, but the disc and the shaft are already pre-drilled for pinning, the machining tolerances on the disc, the shaft, and the body must be held to extremely close limits.

SUMMARY OF THE INVENTION

It is therefore an object of this invention to provide an apparatus and method for maintaining valve element/valve seat positioning within valve designs employing trunnion mounted valve elements.

It is further an object of the present invention to provide an apparatus and method for maintaining disc/seat concentricity within a butterfly valve.

Still a further object of the present invention is to provide an apparatus and method for maintaining valve element/valve seat positioning within valve designs employing trunnion mounted valve elements which permits field replacement of the valve element with a minimum of difficulty.

The above and other objects of the invention will become apparent from the drawings, the description given herein, and appended claims.

In one embodiment, the present invention includes a shaft means which is connected to the valve closure element. The end of the shaft means distal the valve element has an axial bore therein. At least a portion of a plug means is received in the axial bore, the plug means being fixed axially relative to the shaft axis, generally by its connection to the valve body. The plug means is laterally expandable whereby the exterior surface of the plug means received in the bore can be forced against and frictionally engage the wall of the bore in the shaft. The apparatus also includes means for laterally expanding the plug means.

DESCRIPTION OF THE PREFERRED EMBODIMENT

While the invention will be described with particular reference to a butterfly valve, especially a butterfly valve of the double offset disc construction, it is to be understood that the alignment maintaining apparatus herein can be used with other valve assemblies wherein the valve closure element is trunnion mounted in the valve assembly and valve closure element/seat alignment is required.

Figure 6:
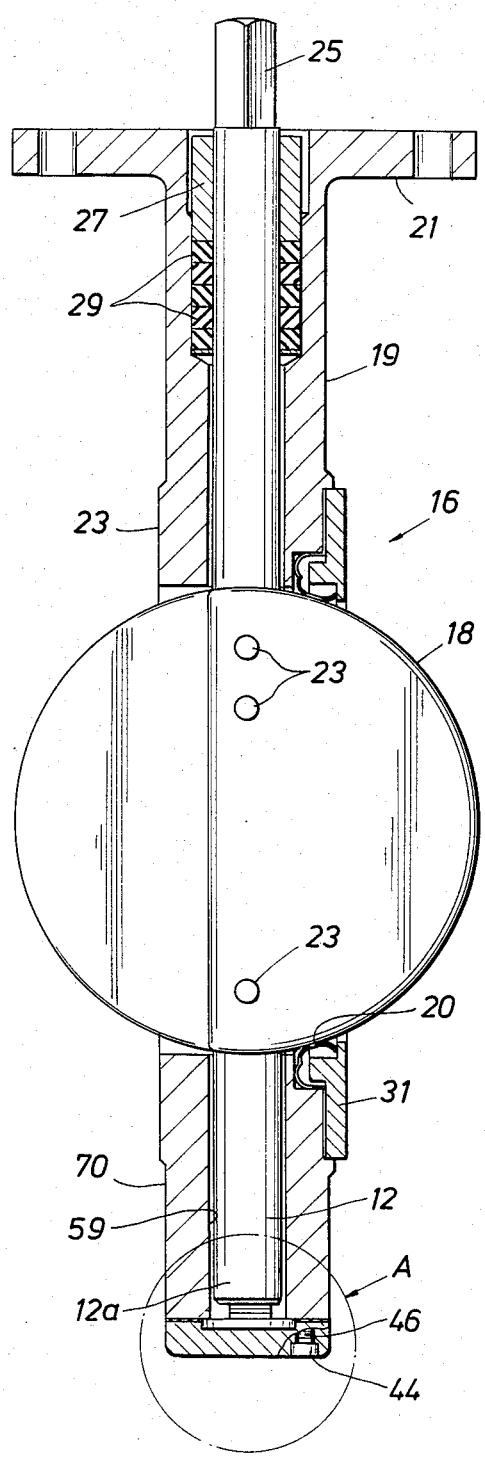
FIG. 6 is a side elevation, in partial section, of a butterfly valve employing the apparatus of the present invention.

With reference to FIG. 6, there is shown a butterfly valve assembly, generally as 16. A shaft 12, having a generally cylindrical external configuration, extends from alignment maintaining assembly 10 (circled as A and shown in FIG. 1), through the vertical axis of a disc 18 mounted in an annular valve body 23, through the neck 19 projecting from valve body 23, and emerges above a flange 21 projecting radially outwardly from neck 19. Shaft 12 is rigidly affixed to disc 18 with pins 23. Pins 23 are self-locking disc screws which permit quick and easy assembly of shaft 12 to disc 18. Shaft 12 is pinned to disc 18 and mounted within butterfly valve body 23 in such a manner so as to permit disc 18 to rotate with the movement of shaft 12. In this regard, the upper end of shaft 12 is provided with wrench flats 25 whereby shaft 12 and hence disc 18 can be rotated via an actuator or with a suitable handle. While, as shown, shaft 12 is of one piece construction, it will be understood that two stub shafts connected to disc 18 could be used instead. As can also be seen with reference to FIG. 6, the valve assembly also includes a conventional packing gland 27 and suitable shaft sealing elements, e.g. Chevron rings, 29 to provide sealing between neck portion 19 and shaft 12.

Valve assembly 16 is also provided with a valve seat 20 held in valve assembly 16 by means of an annular seat retaining plate 31 secured to body 23 by suitable means such as bolts (not shown). As shown in FIG. 6, the valve assembly 16 is in the open position, i.e. with disc 18 aligned parallel to the direction of flow through valve assembly 16. Disc 18 is initially positioned so as to be concentric with seat 20. Seat 20, shown schematically, is an annular body which generally mates with the circumference of disc 18 in an interference fit when disc 18 is in the closed position, i.e. rotated 90° from the position shown in FIG. 6. Seat 20 thus provides a positive fluid tight seal when disc 18 is in its closed position.

It will be understood that the valve seat 20 can take any number of configurations, the only requisite being that an interference fit between the disc 18 and the valve seat 20 be achieved when the valve is in the closed position.

The lower end of shaft 12 is journalled in a bore 59 formed in a boss 70 projecting from annular valve body 23. The end 12a of shaft 12 journalled in boss 70 is provided with an axial bore 24. Bore 24 is generally cylindrical and is concentric with the axis of shaft 12. Within the preferred embodiment of this invention, bore 24 may extend for any desired length within shaft 12.

Figure 5:
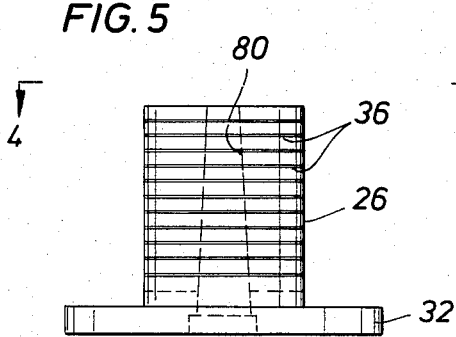
FIG. 5 is a side elevation of the plug element particularly illustrating the serrations about the outer diameter.

Now, with reference to FIGS. 1, 3, 5 and 6, it can be seen that a plug member 26 having a generally cylindrical outer diameter 30 which generally conforms to the configuration of bore 24 is received in bore 24. The outer diameter of plug 26 is slightly smaller than the diameter of bore 24 to permit plug 26 to be received in bore 24. The outer diameter of plug member 26 has a serrated surface 36, as shown in FIG. 5. This serrated surface 36 comprises a series of circumferential grooves cut into the outer diameter of the plug member. These grooves act to provide stronger frictional engagement forces between the exterior surface of plug member 26 and the wall of bore 24. Plug member 26 is also provided with a flange 32 which is generally cylindrical but has a greater diameter than the internal diameter of bore 59.

Figures 3, 7:
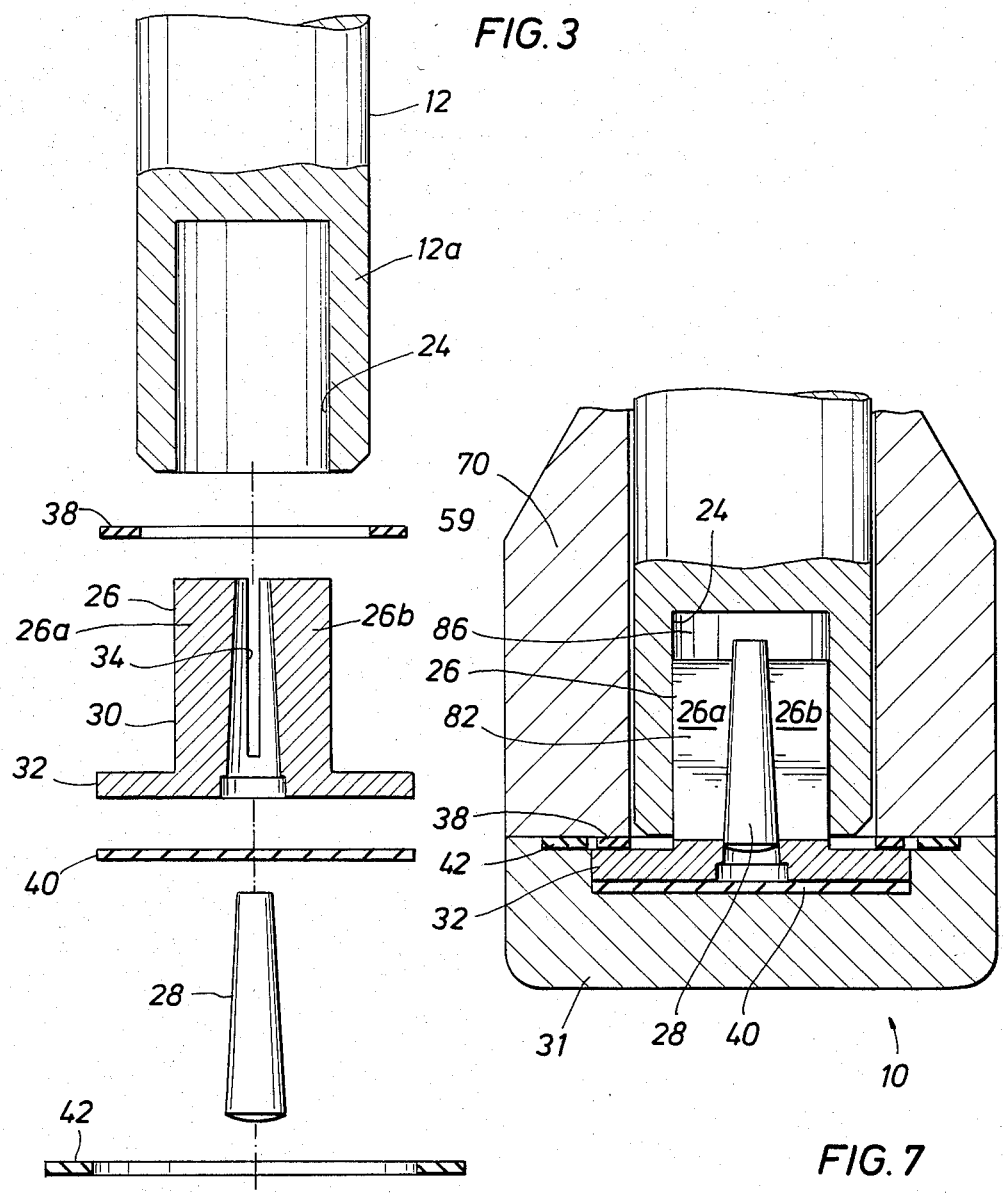
FIG. 3 is an exploded view, in partial section, of the apparatus shown in FIG. 1.
FIG. 7 is a side elevation, in partial section, of the alignment maintaining assembly, particularly showing the arrangement of the assembly where the shaft is oversized or the valve body undersized.
Figure 4:
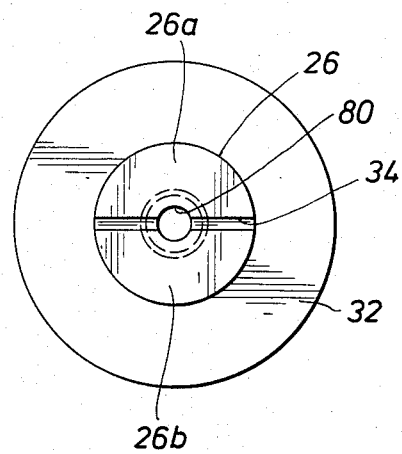
FIG. 4 is a view of the plug element of the present invention taken on the lines 4—4 of FIG. 5.

With particular reference to FIG. 4, it can be seen that plug member 26 is axially slotted as at 34 forming segments 26a and 26b in the portion received in bore 24 of shaft 12. It will be understood that instead of an axial slot 34, a spiral or angled slot can also be employed to provide spreadable or expandable segments similar to segments 26a and 26b. Moreover, any number of expandable or spreadable segments. As also seen with reference to FIGS. 3, 4, and 5, plug 26 is provided with a tapered orifice 80 having its smallest diameter at the end of plug 26 received in bore 24.

In order to create an interference or frictional fit between plug member 26 and the wall of bore 24, internal pressure or force must be applied to the plug member 26 to laterally expand the segments 26a and 26b outwardly. With the flange 32 shouldered against a thrust washer 38, (See Fig. 1) a tapered pin 28 is inserted into the tapered orifice 80 of plug member 26. An axial force is applied to the end of tapered pin 28 which extends beyond flange 32 of plug member 26. In this manner, tapered pin 28 is driven into plug member 26, thereby causing the semi-cylindrical segments 26a and 26b to expand outwardly and frictionally engage the wall of bore 24 of the shaft 12.

Once plug 26 and shaft 12 are forced into frictional engagement, a second thrust bearing 40 is placed between flange 32 and end cover 31 which is secured to boss 70 by means of bolts 44 through holes 46 (See FIG. 6), a gasket 42 serving to provide sealing. It will thus be seen that plug 26 is fixed axially, relative to shaft 12 by being clamped between boss 70 (valve body) and end cover plate 31. It should also be noted that while plug 26 is fixed axially with regard to shaft 12, it is free to rotate with shaft 12 on the bearing surfaces formed by thrust washers 38 and 40.

Figure 2:
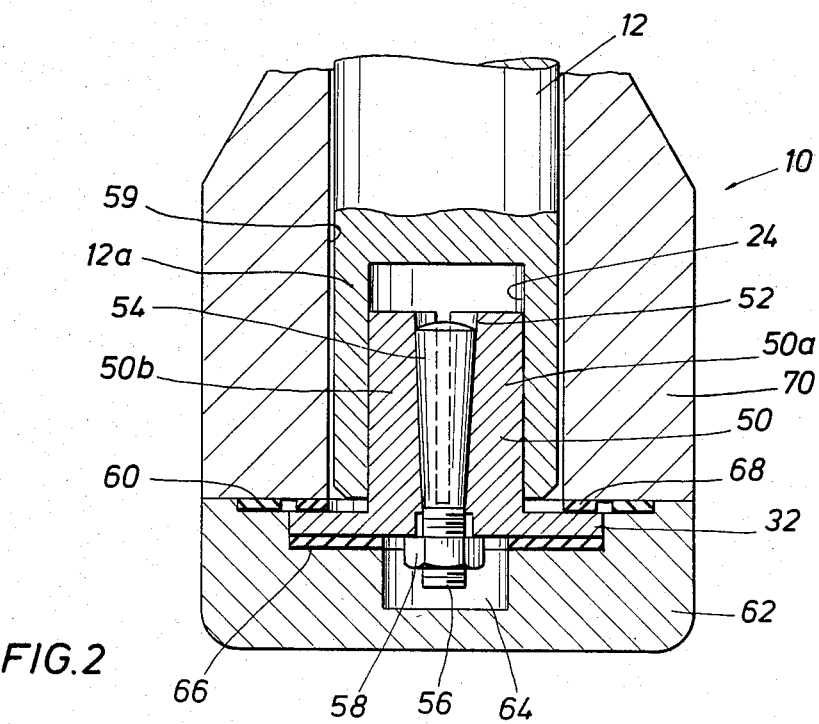
FIG. 2 is a side elevation, in partial section, of an alternative embodiment of the present invention, specifically showing the threaded tapered pin arrangement.

An alternative embodiment of the present invention is depicted in FIG. 2. In this embodiment, the plug member 50 has a tapered orifice 52 and like plug 26 is slotted forming segments 50a and 50b. Tapered orifice 52, however, has its largest diameter at the end received in bore 24 and its smallest diameter at the flange end 32 of the plug member 50. A threaded, tapered pin 54 is inserted into the plug member 50 prior to the insertion of the plug member 50 into bore 24. The threaded portion 56 of tapered pin 54 extends beyond the end of tapered orifice 52 of plug member 50 so that a nut 58 can be threadedly received on threaded section 56 of tapered pin 54. Nut 58 is initially hand fitted until it comes to a stop against flange 32. A wrench, or any other such apparatus, is then used to tighten nut 58 which causes tapered pin 54 to be drawn further into tapered orifice 52. This exerts the requisite internal forces necessary to expand the segments 50a and 50b of plug member 50 laterally outwardly into frictional, interference engagement with the wall of bore 24. A serrated surface 36 is similarly provided on plug 50 to enhance this interference fit. In the embodiment shown in FIG. 2, plug 50 is fixed axially relative to shaft 12 by being clamped between boss 70 and end cover plate 62 which includes a cavity 64 for receiving threaded section 56 of pin 54 and nut 58, sealing being accomplished by a gasket 60. Plug 50 can rotate as shaft 12 is rotated, bearing surfaces for rotation of plug 50 being provided by thrust washers 66 and 68.

Figure 1:
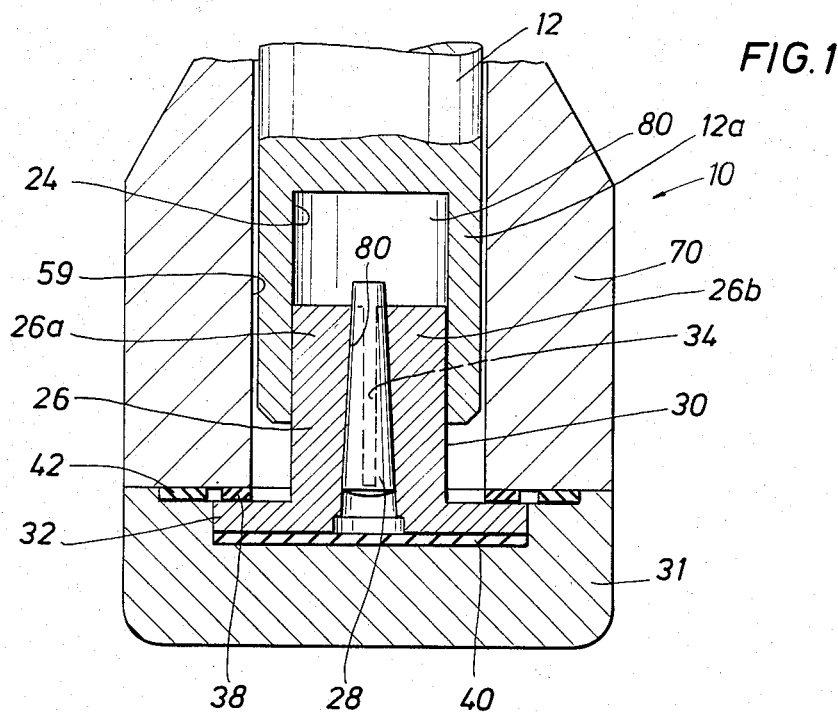
FIG. 1 is a side elevation, in partial section, of the alignment maintaining assembly according to the present invention, specifically showing the plain tapered pin arrangement.

In operation, the assembly of the present invention serves to correct for wide discrepancies in shaft and body machining and sizing. As is particularly illustrated in FIG. 1 and FIG. 7, these wide discrepancies are easily accommodated by the present invention. FIG. 1 illustrates an arrangement where the shaft 12 has an undersized length or the boss 70 has an oversized length. The present invention accommodates this problem, without any additional machining, by creating an interference fit at a lower part of bore 24. Therefore, the disc and seat assemblies are kept in alignment even though there exist machining discrepancies in the length of the shaft 12 or in the size of the body member (boss 70).

With reference now to FIG. 7, there is illustrated a condition wherein the shaft 12 is oversized [or the boss] is undersized. In this arrangement, and as can be seen, plug 26 extends for a considerable distance into bore 24, shaft 12 extending close to flange 32 of plug 26. Once again, sizing discrepancies are accommodated, as shown, without any additional machining.

In either of these two embodiments, the assembly is permanent and requires no additional machining. Because of the pinning arrangement between the shaft and the disc and the bolting arrangement between the end cover and the body of the valve, the shaft may be withdrawn and replaced without disturbing the assembly. Thus, if any disc or shaft replacement is required in the field, the new assembly can be correctly located relative to the valve seat with a minimum of complexity.

Actual tests have shown that the axial force required to move the plug 26 relative to the shaft is many times (8) greater than the force generated by line pressure upon the butterfly valve assembly. Similarly, the rotation of the plug member relative to the shaft requires about 3 times more torque than that generated by the frictional resistance between the plug member and the thrust washer. Importantly, however, the rotation of the plug member relative to the shaft is not detrimental to the axial position of the disc within the seat of the butterfly valve arrangement. In actual tests simulating jamming of the plug member such that it could not rotate, axial movement of the disc was still limited even with the application of excessive torque to rotate the lower shaft relative to the plug.

This invention offers many advantages not found in the prior art. By maintaining the alignment between the disc and the seat, the familiar problems of accelerated seat wear, excessive leakage, and, in some cases, damage leading to total valve failure, are prevented. Since this invention will accommodate wide discrepancies in shaft and body machining, manufacturing costs and kept to a minimum. Similarly, the assembly eliminates the need for machining after initial assembly, thereby enhancing maximum efficiency in the production process.

The foregoing disclosure and description of the invention is illustrative and explanatory thereof, and various changes in the size, shape and materials, as well as in the details of the illustrated construction, may be made within the scope of the appended claims without departing from the spirit of the invention.

I claim:

1. An apparauts for maintaining a trunnion mounted valve closure element in a predetermined relationship relative to a valve seat disposed in a valve body comprising:

shaft means, said shaft means being connectable to said valve element, the end of such shaft means distal said valve element having an axial bore defining a wall;

plug means, at least a portion of which is received in said bore, said plug means having means to axially fix said plug means relative to said shaft means, said plug means being laterally expandable, said plug means having an exterior surface provided with means for preventing axial movement of said shaft means relative to said plug means when said plug means is laterally expanded said shaft and said plug means being rotatable relative to said valve body; and means for laterally expanding said plug means.

2. The apparatus of claim 1 wherein said valve closure element comprises a disc for a butterfly valve, said disc being mounted so as to be concentric with said valve seat.

3. The apparatus of claim 1 wherein said bore has a generally cylindrical shape.

4. The apparatus of claim 3 wherein said exterior surface of said plug means generally conforms to the shape of said bore.

5. The apparatus of claim 3 wherein said plug means further includes a radially extending flange distal the end of said plug means received in said bore.

6. The apparatus of claim 1 wherein said portion of said plug means received in said bore is slotted.

7. The apparatus of claim 1 wherein said plug means has a serrated exterior surface.

8. The apparatus of claim 1 wherein said plug means has a tapered orifice extending therethrough.

9. The apparatus of claim 8 wherein said tapered orifice has its largest diameter at the end of said plug means distal said end received in said bore.

10. The apparatus of claim 9 further including a tapered pin having an external surface generally conforming to said tapered orifice, said tapered pin wedgingly engaging the surface of said tapered orifice.

11. The apparatus of claim 8 wherein said tapered orifice has its largest diameter at the end of said plug means received in said bore.

12. The apparatus of claim 11 further including a tapered, threaded pin, said threaded pin having an external surface generally conforming to said tapered orifice, said threaded pin wedgingly engaging the surface of said tapered orifice.

13. The apparatus of claim 12 further including a nut means threadedly received on said threaded end of said tapered pin.

* * * * *